No. 2,061,534

UNITED STATES PATENT OFFICE 2,061,534

FERTILIZER IN GRANULAR FORM

Otto Balz, Ludwigshafen-on-the-Rhine, Adolf Leber, Mannheim, and Heinrich Diekmann, Ludwigshafen - on - the - Rhine, Germany, assignors to I. G. Farbenindustrie Aktiengesellschaft, Frankfort-on-the-Main, Germany No Drawing. Application July 18, 1933, Serial No. 680,976. In Germany July 20, 1932

8 Claims. (Cl. 71—61)

The present invention relates to a mixed fertilizer in granular form comprising ammonium chloride and a carbonate of the alkaline earth metals or magnesium, and a process of producing it.

A mixture of ammonium chloride and calcium carbonate having a nitrogen content of about 17 per cent is known in commerce as a fertilizer. This mixture does not satisfy the requirements placed by agriculture on fertilizers as regards their capacity for being scattered by reason of its loose pulverulent nature. The conversion of the pulverulent mixture into granular form offers considerable difficulty, however, by reason of its infusibility.

We have now found that mixtures of ammonium chloride and carbonates of the alkaline earth metals including magnesium, especially calcium carbonate, are readily converted into granular products having a good hardness and strength by agitating a moist mixture in which the said components are present in a comminuted state, and drying it. In order to obtain granules the water content should as a rule range between about 4 and about 15 per cent, and a water content of about 5 per cent, preferably from 7 to 9 per cent, is especially suitable. The proportions of ammonium chloride, and calcium carbonate, or another alkaline earth metal carbonate will as a rule range between 1 and 4 parts of the former for each part of the latter.

The water content may be incorporated with the said mixtures by adding the necessary quantity of water to the mixture or during the mixing operation of the pulverulent components by spraying or by the addition of steam, or a solution of ammonium chloride may be incorporated with the carbonate. On the other hand also the carbonate of the alkaline earth metals or magnesium may be employed in the moist state, for example in the form of a pulp of precipitated calcium carbonate, to supply the necessary water content to the mixture.

The moist mixture is brought into granular form by agitating it in a rotary tube or on a shaking sheet and is then dried. The drying of the moist mixture may also be effected in a rotary oven by means of hot gases, the gases being led in the same direction or in counter current. When employing a rotary oven, a conversion of the moist mass into granular form takes place directly in the drying apparatus.

The production of the granules may be assisted by means of suitable substances favouring the cementation. Additional substances suitable for this purpose include both insoluble substances, such as clay, minerals containing clay, loess, marl, loam and bauxite, and soluble substances, as for example glue and the various water-soluble salts, as for example sulphates, nitrates or chlorides of the alkali metals, ammonium, calcium, magnesium, aluminium or iron, or mixtures thereof.

The additional substances may be incorporated in any way, as for example during the mixing of the ammonium chloride with the calcium carbonate and the subsequent treatment with water, either in a dry form or as an aqueous solution or suspension, and the necessary water content may thus be supplied.

The grains of the fertilizers granulated in the said manner have a strength sufficient to withstand the requirements of storage and shipment, turning with shovels, or filling into sacks.

The following examples will further illustrate the nature of this invention but the invention is not restricted to these examples.

Example 1

A mixture of 64 kilograms of ammonium chloride and 36 kilograms of ground limestone (preferably containing clay) are intimately mixed with from about 6 to 7 litres of water. The moist mixture is coarsely comminuted by bringing it onto a shaking sheet where it is converted into ball-like shapes by the shaking movement of the sheet. After drying, a product is obtained which is quite free from dust and has a satisfactory hardness.

Example 2

37 kilograms of calcium carbonate are mixed with 3 kilograms of ammonium nitrate and from 6 to 7 kilograms of water to form a paste. 60 kilograms of ammonium chloride are then incorporated and the resulting mass passed through a sieve into a rotary tubular oven. After drying, ball-shaped bodies are obtained having a good hardness.

Example 3

A mixture of 32 kilograms of finely ground calcium carbonate, 60 kilograms of ammonium chloride and 8 kilograms of dry clay is moistened with from 8 to 10 litres of water and thoroughly mixed. The resulting paste is then divided into small pieces by a suitable mechanical device and dried in a rotary oven by hot gases flowing in the same direction or in counter current. In this manner a well granulated, hard product without dusty constituents is obtained which consists mainly of ball-shaped pieces.

*Example 4*

65 kilograms of ammonium chloride are intimately mixed with 7 kilograms of air-dry clay and 37 kilograms of precipitated calcium carbonate containing about 24 per cent of water. The moist mixture is fed into a rotating oven heated in countercurrent with hot gases, and is converted into granular form by rolling on the inner surface of the oven and dried. The resulting product consists of granules of which 80 per cent have a diameter between 0.5 and 4 millimetres, the remaining part of the product being reintroduced into the mixing device.

What we claim is:—

1. A process of producing a fertilizer in granular form, which comprises agitating a mixture essentially containing ammonium chloride and a carbonate of the alkaline earth metals or magnesium in a comminuted state in the proportion of from about 1 to 4 parts of ammonium chloride to about one part of the carbonate and having a water content of between about 7 and about 9 per cent, bringing the mixture into a granular form and then drying the granules.

2. A process of producing a fertilizer in granular form which comprises agitating a moist mixture essentially containing ammonium chloride and a carbonate of the alkaline earth metals or magnesium in the proportion of from about 1 to 4 parts of ammonium chloride to about 1 part of the carbonate, in a comminuted state, bringing the mixture into a granular form and then drying the granules.

3. A process of producing a fertilizer in granular form, which comprises agitating a mixture essentially containing ammonium chloride and a carbonate of the alkaline earth metals or magnesium in the proportion of from about 1 to 4 parts of ammonium chloride to about one part of the carbonate, in a comminuted state having a water content of between about 4 and about 15 per cent, bringing the mixture into a granular form and then drying the granules.

4. A process of producing a fertilizer in granular form, which comprises agitating a moist mixture essentially containing ammonium chloride and a carbonate of the alkaline earth metals or magnesium in the proportion of from about 1 to 4 parts of ammonium chloride to about one part of the carbonate, said ammonium chloride and the carbonate in said proportion being capable of alone bringing about the granulation thereof, and a minor proportion of a cementing agent, said solid ingredients being in a comminuted state, bringing the mixture into a granular form and then drying the granules.

5. A process of producing a ferilizer in granular form, which comprises agitating a mixture essentially containing ammonium chloride and a carbonate of the alkaline earth metals or magnesium in the proportion of from about 1 to 4 parts of ammonium chloride to about one part of the carbonate, said ammonium chloride and the carbonate in said proportion being capable of alone bringing about the granulation thereof, and a minor proportion of a cementing agent, said solid ingredients being in a comminuted state and having a water content of between about 4 and about 15 per cent, bringing the mixture into a granular form and then drying the granules.

6. A mixed fertilizer in granular form essentially comprising from about 1 to 4 parts of ammonium chloride and about 1 part of a carbonate of the alkaline earth metals or magnesium.

7. A mixed fertilizer in granular form essentially comprising ammonium chloride and a carbonate of the alkaline earth metals or magnesium in the proportion of from about 1 to 4 parts of ammonium chloride to about one part of the carbonate, said ammonium chloride and the carbonate in said proportion being capable of alone bringing about the granulation thereof, and a minor proportion of a cementing agent.

8. A mixed fertilizer in granular form essentially comprising ammonium chloride and a carbonate of the alkaline earth metals or magnesium in the proportion of from about 1 to 4 parts of ammonium chloride to about one part of the carbonate, said ammonium chloride and the carbonate in said proportion being capable of alone bringing about the granulation thereof, and a minor proportion of an argillaceous cementing agent.

OTTO BALZ.
ADOLF LEBER.
HEINRICH DIEKMANN.